UNITED STATES PATENT OFFICE.

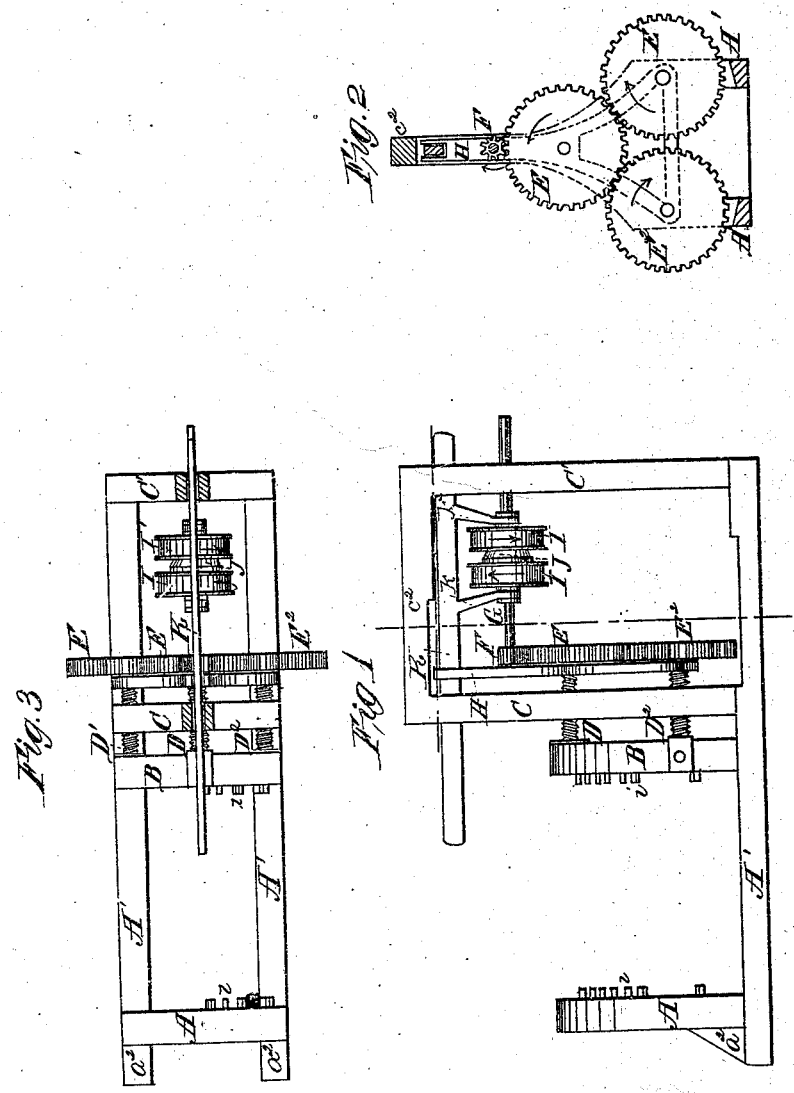

EDWARD HOLMES AND BRITAIN HOLMES, OF BUFFALO, NEW YORK.

IMPROVEMENT IN MACHINES FOR LEVELING THE STAVES IN BARRELS.

Specification forming part of Letters Patent No. 80,482, dated July 28, 1868.

*To all whom it may concern:*

Be it known that we, EDWARD HOLMES and BRITAIN HOLMES, of the city of Buffalo, county of Erie, and State of New York, have invented a certain new and Improved Cask-Leveling Machine; and we do hereby declare that the following is a full and exact description thereof, reference being had to the accompanying drawings, making a part of this specification, in which—

Figure I is a side elevation. Fig. II is a transverse sectional elevation. Fig. III is a top view.

The nature of this invention consists in leveling casks and forcing or pressing them into the proper shape for chamfering, crozing, and howeling by the application of mechanical power.

Letters of like name and kind refer to like parts in each of the figures.

A represents a stationary head-block, erected upon the ends of the bottom frame-timbers, A', which support the whole machine. This head-block is braced and held firmly in an upright position by means of the brackets $a^2$, or other equivalent device.

B represents another head-block or driver, which is made movable upon the timbers A', in an upright position, those sides of the head-blocks which face each other being made parallel and at right angles to the bottom timbers, A'.

C C' represent two upright posts or walls, placed transversely upon the timbers A', a sufficient distance apart to contain the gearing or apparatus by means of which the head-block B is moved back and forth. The tops of these upright posts are connected by a horizontal timber, $c^2$.

D D' D² are screws of large diameter, and having a thread sufficiently strong for the work which it is intended to perform. One end of these screws is connected to the movable head-block or driver B in such manner that, though each screw may be allowed to revolve freely around its own axis, they cannot be disconnected longitudinally from the head-block or driver. The screws pass horizontally through the post C, corresponding nuts being sunk into the post for that purpose. Upon the opposite ends of the screws large spur-wheels E E' E² are attached. Two of these, E' and E², do not mesh with each other, but are in gear with and driven by the spur-wheel E. The screw D is a left screw, while the screws D' and D² are right screws. Consequently, whenever either one of the gear-wheels is set in motion, all three will revolve in a manner to cause the screws to operate conjointly, and thus move the head-block or driver B in the same direction. Motion is communicated to these gear-wheels by means of the pinion F upon the shaft G, which is supported in a bearing formed upon the post C', and another upon the vertical metal brace H. The lower end of this brace is triangular, and has bearings for the screws and gear-wheels.

I I' represent two loose pulleys, and J a friction-clutch between them, upon the shaft G. The clutch is keyed to the shaft, and when not in contact with either of the pulleys does not revolve. One of the pulleys is revolved by any convenient means or connection in one direction and the other pulley in the opposite direction, and hence when the clutch is brought into contact with one pulley it will revolve the gearing E E' E² and operate the screws D D' D² in a manner to push the head-block or driver B forward, and when the clutch is brought into contact with the other pulley it will revolve the gearing in the opposite direction, so that the screws will draw the head-block or driver back, or into its former position.

K represents a clutch-bar, which rests in openings or slots made in the frame-posts C C', and is allowed a horizontal movement within its bearings. Two arms, $k'$ $k^2$, take hold of the pulleys I I' and guide either of them into contact with the friction-clutch wheel J, (as may be required,) by simply moving the clutch-bar K to the right or left by any convenient mechanical means. The upper end of the brace H is made forked, and the clutch-bar passes through said fork in a manner to retain the brace in a vertical position.

Operation: Supposing the clutch-wheel J to be disconnected from either of the pulleys I I', and these pulleys revolving loosely upon the shaft in different or opposite directions, as shown by the red arrows, the gearing and screws and head-block or driver B are consequently at rest. Now the cask, the staves of which have been placed in position, and are securely held together by truss-hoops, and which are to be leveled by this machine, is rolled between the two head-blocks A and B and placed upon suitable fixed or adjustable rests or pins, $l$, upon the inner faces of the head-blocks. When thus properly placed in a level position the attendant moves the clutch-bar, so as to bring the pulley I into contact with the friction-clutch wheel J, whereupon the shaft will revolve rapidly and set the gearing in motion in such manner that the screws revolve and move the head-block or driver B in a direction to approach the stationary head-block. Thus the staves of the cask which project from the edge thereof will be forced back into line with the others until the head ends of the cask are leveled. By moving the clutch-bar in the opposite direction, so as to bring the pulley I' into contact with the clutch-wheel J, the motion of the whole train of wheels and screws will be reversed, and hence the head-block or driver B drawn back. The cask may then be removed and another substituted, and the operation renewed.

In the construction of this machine it is not necessary to arrange the several operating parts as above described, because the principle of this invention is broad and covers more than the specific construction of the parts. Thus, for instance, either one or both the head-blocks may be made movable drivers, and level the cask when either in a horizontal or vertical position, as may be most convenient.

Instead of the arrangement of screws, the driver may also be operated by a powerful blow without departing from the principle and meaning of this invention.

As a labor-saving machine our improvement is of great importance in the manufacture of casks, barrels, and the like. Instead of the tedious work of hammering each stave into its proper position by hand, we simply feed the casks from one side to the machine, and roll them off, when leveled, upon the other side, thereby saving a great amount of time and labor and expense.

What we claim as our invention, and desire to secure by Letters Patent, is—

The combination and arrangement of the head-block A, movable driver B, and its operating-screws D D' D², spur-wheels E E' E², and driving-pinion F, or their equivalents, operating substantially as herein described.

EDWARD HOLMES.
BRITAIN HOLMES.

Witnesses:
W. H. FORBUSH,
EDWARD WILHELM.